United States Patent [19]

Shank

[11] 3,853,336
[45] Dec. 10, 1974

[54] TELESCOPING EXPANSION JOINT FOR TUBULAR ELEMENT

[75] Inventor: Wayne C. Shank, Tucson, Ariz.
[73] Assignee: Avco Corporation, Williamsport, Pa.
[22] Filed: Aug. 3, 1973
[21] Appl. No.: 385,540

[52] U.S. Cl................... 285/18, 285/302, 285/187
[51] Int. Cl............................................ F16l 55/00
[58] Field of Search ............... 285/18, 23, 187, 302

[56] References Cited
UNITED STATES PATENTS
2,809,057  10/1957  McEachern...................... 285/187
3,487,534  1/1970  Schustack....................... 285/18 X

*Primary Examiner*—Jordan Franklin
*Assistant Examiner*—Peter Nerbun
*Attorney, Agent, or Firm*—Charles M. Hogan; Irwin P. Garfinkle

[57] ABSTRACT

An expansion joint between an annular turbine shroud and an exhaust diffuser comprises telescoped inner and outer tubular sections connected to the turbine components. The outer tubular section has a pair of inwardly facing circumferential grooves, each receiving a contracting piston ring that sealingly engages the outer periphery of the inner tubular section when the joint is assembled. A thin wall sleeve is used to expand the piston rings sufficiently to permit telescoping of the inner section into the outer section during assembly. A flange integral with one end of the sleeve abuts the end of the inner section so that the sleeve is pulled clear of the piston rings to permit a sealing engagement with the inner section. The sleeve is received in a pocket formed between the inner and outer sections after the joint is assembled.

5 Claims, 5 Drawing Figures

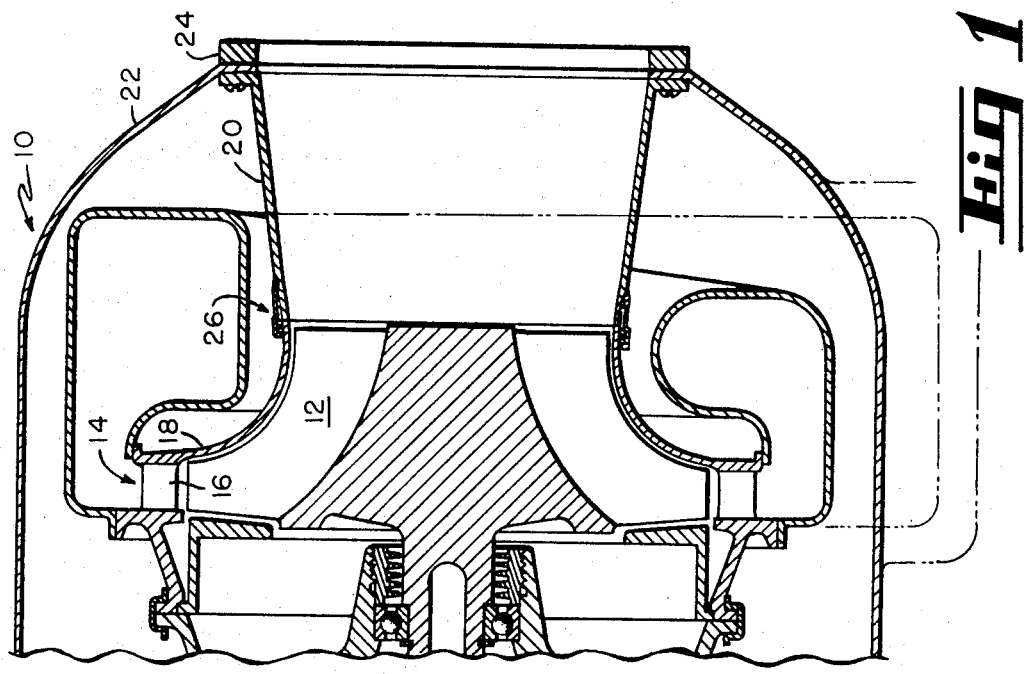

TELESCOPING EXPANSION JOINT FOR TUBULAR ELEMENT

The exhaust duct of a gas turbine engine generally connects to a turbine shroud which experiences different temperature changes. To eliminate the potential thermal stresses that can occur at this point, an expansion joint is desired. The use of contracting piston rings and telescoping tubular sections has been proposed to provide a flexible sealing joint, but they are difficult to assemble. One solution to the problem of assembly of a telescoping tubular expansion joint may be found in the copending patent application entitled "Telescoping Expansion Joint for Tubular Elements and Apparatus for Facilitating the Assembly Thereof," Val Cronstedt inventor, Ser. No. 375,639, filed July 2, 1973, and of common assignment with the present invention.

The above assembly problems and those of assembling tubular expansion joints in general are solved in practicing the present invention by incorporating an assembly ring in an expansion joint, comprised of inner and outer tubular sections. The assembly ring is used to expand piston rings in the outer section for initial insertion of the inner into the outer section. The assembly ring is pushed clear of the piston rings by the inner section for sealing engagement but still remains a part of the assembled joint.

The above and other related features of the present invention will be apparent from a reading of the following description of the disclosure shown in the accompanying drawing and the novelty thereof pointed out in the appended claims.

In the drawing:

FIG. 1 is a fragmentary simplified view of a gas turbine engine showing the turbine exhaust elements with which the present expansion joint may be used; and FIGS. 2, 3, 4 and 5 are fragmentary enlarged views of the expansion joint shown in FIG. 1 in successive stages of assembly.

FIG. 1 shows an exhaust section 10 of a gas turbine engine. The exhaust section comprises a radial inflow turbine wheel 12 receiving a hot gas stream from a turbine inlet duct 14 via turbine inlet nozzle 16. The turbine inlet duct 14 receives the hot gas stream from a combustor (not shown), as is well known to those skilled in the art. Integral with the aft end of the turbine inlet nozzle 16 is an annular turbine shroud 18 for the radial inflow turbine 12. A turbine exhaust duct or diffuser 20 is suitably secured to an annular outer casing 22 through a support ring 24 adjacent its aft end. The turbine exhaust duct 20 extends forward to and meets the turbine shroud 18 at an expansion joint, generally indicated at 26.

Referring to FIG. 5 the assembled expansion joint 26 comprises an inner tubular section 28 integral with the aft end of turbine shroud 18. The inner section 28 has an outer cylindrical sealing surface 30 and an inwardly facing shoulder 32 terminating in end 29. The shoulder 32 receives the forward end 34 of the exhaust duct 20. The outer section of the expansion joint is formed from a tubular element or sleeve 36 having an inwardly directed flange section 38 suitably secured to the exhaust duct 20 at a point spaced from end 34. Sleeve 36 has a pair of circumferential grooves 40 in a built-up section 41 adjacent its free end. The grooves 40 receive contracting piston rings 42 which have a free shape defining an inner diameter smaller than the outer diameter of surface 30 on section 28, as shown in FIG. 2.

It is apparent in looking at FIGS. 5 and 1 that, prior to assembly of the expansion joint 26, the piston rings 42 must be expanded. For the turbine engine application that is illustrated, the piston rings 42 are in a rather limited space that is difficult to get at. To alleviate this problem the assembly ring 44 is utilized. As shown in FIGS. 3, 4 and 5, the assembly ring 44 comprises a thin wall sleeve 46 having an outer diameter sufficiently great to expand the piston rings 42 into the grooves 40 and to permit the inner section 28 to be telescoped into sleeve 46. Sleeve 46 has an integral inwardly directed flange 48 having an inner diameter that produces an interference clearance with respect to the end 29 of inner section 28 (see FIG. 3). The inner diameter of flange 48 is sufficiently great, however, to permit it to be telescoped over the exhaust duct 20.

To assemble the joint shown in FIGS. 2-5 the rings 42 are expanded by a suitable expansion device and sleeve 46 pulled into place over rings 42, thus maintaining them expanded into grooves 40 (FIG. 3). With the assembly ring 44 in place the inner section 28 is telescoped into the interior of sleeve 46 to the point where the end 29 of inner section 28 abuts the flange 48 (FIG. 4). Further movement of inner section 28 into the outer section 36 displaces the assembly ring 44 axially. As noted particularly in FIG. 5, the distance L between the right-hand groove 40 and the end 34 of duct 20 is sufficiently great to permit the inner section 28 to displace the assembly ring 44 clear of the piston rings 42, thus permitting them to contract into sealing engagement with the outer periphery 30 of inner section 28. With the sections 28 and 36 telescoped into their assembled position, the assembly ring 44 is retained in an annular pocket 50 formed between the inner and outer sections 28 and 36.

The expansion joint described above simplifies the assembly for a gas turbine shown in FIG. 1 to the highest degree. What heretofore has been a complicated procedure is reduced to the simple process of placing the assembly ring over the piston rings and telescoping the sections together, which automatically permits the rings to contract into engagement. Disassembly takes place by simply pulling the sections apart. The assembly ring may thus be re-used for further assembly operations. After the joint is fully assembled the assembly ring 44 is conveniently retained between the inner and outer sections.

The above expansion joint has been described in connection with an exhaust section of a gas turbine engine. However, it may be applied to tubular telescoping expansion joints in general with equal effectiveness. The preferred embodiment of the present invention has been described but it should be apparent to those skilled in the art that it may be executed in different forms without departing from its spirit and scope.

Having thus described the invention, what is claimed as novel and desired to be secured by Letters Patent of the United States is:

1. An expansion joint for sealing the connection between first and second tubular sections, said sections having equal inner diameters and being directly adjacent each other in assembled form, said expansion joint comprising:

a sleeve surrounding said sections at the junction thereof, said sleeve having an inner diameter greater than the outer diameter of said sections to form an annular chamber between said sections and said sleeve, one end of said sleeve being peripherally secured to one of said sections;

an inwardly facing circumferential groove in said sleeve adjacent its other end;

a piston-type flexible ring received in said inwardly facing groove, said piston ring having an inner diameter less than the outer diameter of said other section so that the inner diameter of said piston ring sealingly engages the periphery of said other section when said sections are connected;

an annular assembly ring telescoped into said sleeve at said groove for expanding said piston ring into said groove, said assembly ring having an inner diameter greater than the outer diameter of said other section to permit said other section to be telescoped into said assembly ring; and means defining an interference clearance between the end of said inner section and said assembly ring so that when said other section is telescoped into said sleeve, said section displaces said assembly ring axially clear of said piston ring and into said annular chamber, thus permitting said piston ring to contract and sealingly engage said other section.

2. An expansion joint as in claim 1 wherein said interference clearance means comprises a radial flange on said assembly ring and extending radially inward to define an interference clearance relative to the end of said other section.

3. An expansion joint as in claim 2 wherein said assembly ring comprises a relatively thin wall sleeve integral with said flange.

4. An expansion joint as in claim 1 wherein said assembly ring comprises a relatively thin wall sleeve having an integral radially inwardly extending flange having an inner diameter great enough to permit it to be telescoped over the end of said second element and sufficiently small to form an interference clearance relative to said inner section.

5. An expansion joint as in claim 4 wherein said outer section has a pair of circumferential grooves each receiving a piston-type ring.

* * * * *